(12) United States Patent
Colombi et al.

(10) Patent No.: US 9,735,615 B2
(45) Date of Patent: Aug. 15, 2017

(54) SYSTEMS AND METHODS FOR MANAGING POWER BACKFEED IN UNINTERRUPTIBLE POWER SUPPLY SYSTEMS

(71) Applicant: General Electric Company, Schenectady, NY (US)

(72) Inventors: Silvio Colombi, Losone (CH); Andrea Mannuccini, Locarno (CH)

(73) Assignee: General Electric Company, Schenectady, NY (US)

(*) Notice: Subject to any disclaimer, the term of this patent is extended or adjusted under 35 U.S.C. 154(b) by 408 days.

(21) Appl. No.: 14/592,305

(22) Filed: Jan. 8, 2015

(65) Prior Publication Data
US 2016/0020646 A1 Jan. 21, 2016

Related U.S. Application Data

(60) Provisional application No. 62/025,523, filed on Jul. 17, 2014.

(51) Int. Cl.
*H02J 9/06* (2006.01)
*H02J 3/46* (2006.01)

(52) U.S. Cl.
CPC ............. *H02J 9/061* (2013.01); *H02J 3/46* (2013.01); *H02J 9/062* (2013.01)

(58) Field of Classification Search
CPC ............. H02J 3/46; H02J 9/061; H02J 9/062
USPC ................ 307/18, 19, 20, 23, 24, 51, 64, 65
See application file for complete search history.

(56) References Cited

U.S. PATENT DOCUMENTS

| | | | |
|---|---|---|---|
| 4,763,013 A | 8/1988 | Groth, Jr. et al. | |
| 6,191,500 B1 | 2/2001 | Toy | |
| 7,274,112 B2 | 9/2007 | Hjort et al. | |
| 7,446,437 B2 | 11/2008 | Paik et al. | |
| 7,459,803 B2 | 12/2008 | Mosman | |
| 8,001,392 B2 | 8/2011 | Anderson | |
| 8,686,594 B2 | 4/2014 | Morales et al. | |
| 2011/0278934 A1* | 11/2011 | Ghosh | H02J 9/062 307/66 |
| 2014/0021789 A1 | 1/2014 | Greer et al. | |
| 2014/0183955 A1 | 7/2014 | Colombi et al. | |
| 2015/0008744 A1* | 1/2015 | Navarro | H02J 9/061 307/64 |

(Continued)

OTHER PUBLICATIONS

Byun et al., "Parallel operation of three-phase UPS inverters by wireless load sharing control" Telecommunications Energy Conference, 2000. INTELEC. Twenty-second International, Sep. 2000, pp. 526-532.

(Continued)

*Primary Examiner* — William Hernandez
(74) *Attorney, Agent, or Firm* — General Electric Company

(57) ABSTRACT

A system is provided. The system includes a plurality of uninterruptible power supplies (UPSs), a ring bus, and at least one controller communicatively coupled to the plurality of UPSs, the at least one controller configured to calculate an output voltage frequency for each UPS of the plurality of UPSs, wherein the output voltage frequency for a UPS of the plurality of UPSs is calculated based at least on a derivative of an average active output power of the UPS, and control operation of each UPS based on the respective calculated output voltage frequencies.

20 Claims, 3 Drawing Sheets

(56) References Cited

U.S. PATENT DOCUMENTS

2015/0263567 A1\* 9/2015 Kolhatkar ............... G05F 3/02
 307/23

OTHER PUBLICATIONS

Guerrero et al., "Wireless-Control Strategy for Parallel Operation of Distributed-Generation Inverters", IEEE Transactions on Industrial Electronics, Oct. 2006, vol. No. 53, Issue No. 5, pp. 1461-1470.
European Search Report and Opinion issued in connection with corresponding EP Application No. 15175518.8 on Nov. 23, 2015.
Herbener, Frank, "Isolated-Parallel UPS Configuration", Piller Power System, pp. 1-15.
Mosman, Mike, "ISO-Parallel Rotary UPS Configuration", Newslink Fall 2004, 7x24 Exchange, pp. 1-16, 2005.
Guerrero, J.M., et al., "Control of Distributed Uninterruptible Power Supply Systems", Industrial Electronics, IEEE Transactions, vol. 55, Issue 8, pp. 2845-2859, Aug. 2008.

\* cited by examiner

SYSTEMS AND METHODS FOR MANAGING POWER BACKFEED IN UNINTERRUPTIBLE POWER SUPPLY SYSTEMS

CROSS REFERENCE TO RELATED APPLICATIONS

This application is a non-provisional application and claims priority to U.S. Provisional Patent Application Ser. No. 62/025,523 filed Jul. 17, 2014 for "SYSTEMS AND METHODS FOR MANAGING POWER BACKFEED IN UNINTERRUPTIBLE POWER SUPPLY SYSTEMS", which is hereby incorporated by reference in its entirety.

BACKGROUND

The field of the invention relates generally to uninterruptible power supplies, and more particularly, to managing power backfeed in uninterruptible power supplies in a ring bus architecture.

Robust power systems enable supplying power to one or more loads. Such power systems may include combinations of generation, transport, rectification, inversion and conversion of power to supply energy for electronic, optical, mechanical, and/or nuclear applications and loads. When implementing power systems and architectures, practical considerations include cost, size, reliability, and ease of implementation.

In at least some known power systems, one or more uninterruptible power supplies (UPSs) facilitate supplying power to a load. UPSs facilitate ensuring that power is continuously supplied to one or more critical loads, even when one or more components of a power system fail. Accordingly, UPSs provide a redundant power source. UPSs may be utilized in a number of applications (e.g., utility substations, industrial plants, marine systems, high security systems, hospitals, datacomm and telecomm centers, semiconductor manufacturing sites, nuclear power plants, etc.). Further, UPSs may be utilized in high, medium, or low power applications. For example, UPSs may be used in relatively small power systems (e.g., entertainment or consumer systems) or microsystems (e.g., a chip-based system).

BRIEF DESCRIPTION

In one aspect, a system is provided. The system includes a plurality of uninterruptible power supplies (UPSs), a ring bus, and at least one controller communicatively coupled to the plurality of UPSs, the at least one controller configured to calculate an output voltage frequency for each UPS of the plurality of UPSs, wherein the output voltage frequency for a UPS of the plurality of UPSs is calculated based at least on a derivative of an average active output power of the UPS, and control operation of each UPS based on the respective calculated output voltage frequencies.

In another aspect, at least one controller for controlling a power supply system that includes a plurality of uninterruptible power supplies (UPSs), a ring bus, and at least one load electrically coupled to the plurality of UPSs and the ring bus is provided. The at least one controller includes a processor, and a memory device communicatively coupled to the processor, the memory device storing executable instructions configured to cause the processor to calculate an output voltage frequency for each UPS of the plurality of UPSs, wherein the output voltage frequency for a UPS of the plurality of UPSs is calculated based at least on a derivative of an average active output power of the UPS, and control operation of each UPS based on the respective calculated output voltage frequencies.

In yet another aspect, a method of controlling a power supply system that includes a plurality of uninterruptible power supplies (UPSs), a ring bus, and at least one load electrically coupled to the plurality of UPSs and the ring bus is provided. The methods includes calculating, using at least one controller communicatively coupled to the plurality of UPSs, an output voltage frequency for each UPS of the plurality of UPSs, wherein the output voltage frequency for a UPS of the plurality of UPSs is calculated based at least on a derivative of an average active output power of the UPS, and controlling operation of each UPS based on the respective calculated output voltage frequencies.

DETAILED DESCRIPTION

The systems and methods described herein provide an advanced method to manage power backfeed from a ring bus to a UPS. This allows for relatively large variations of local loads without the need to oversize DC link capacitors. The systems and methods described herein also provide at least some collateral advantages, including improvements realized regarding cost, feasibility, and in turn, viability of a static UPS ring bus architectures.

Exemplary embodiments of an uninterruptible power supply system are described here. The plurality of uninterruptible power supplies are arranged in a ring bus configuration and configured to supply power to at least one load. One or more control devices are communicatively coupled to the plurality of uninterruptible power supplies. The control devices calculate an output voltage frequency for each of the plurality of uninterruptible power supplies based at least in part on a derivative of an average output power, and control the uninterruptible power supplies such that each uninterruptible power supply operates at its respective calculated frequency to supply power to the at least one load. Notably, the frequencies of operation of various UPSs are different in transient conditions (e.g., following a variation of one or more loads). Once droop controls are in a steady state, however, all UPSs operate at the same frequency, but with a phase shift across associated chokes that equalize active power provided by each UPS. Droop controls, as described herein, determine instantaneous frequency and amplitudes of the output voltage of each UPS.

Figure 1:
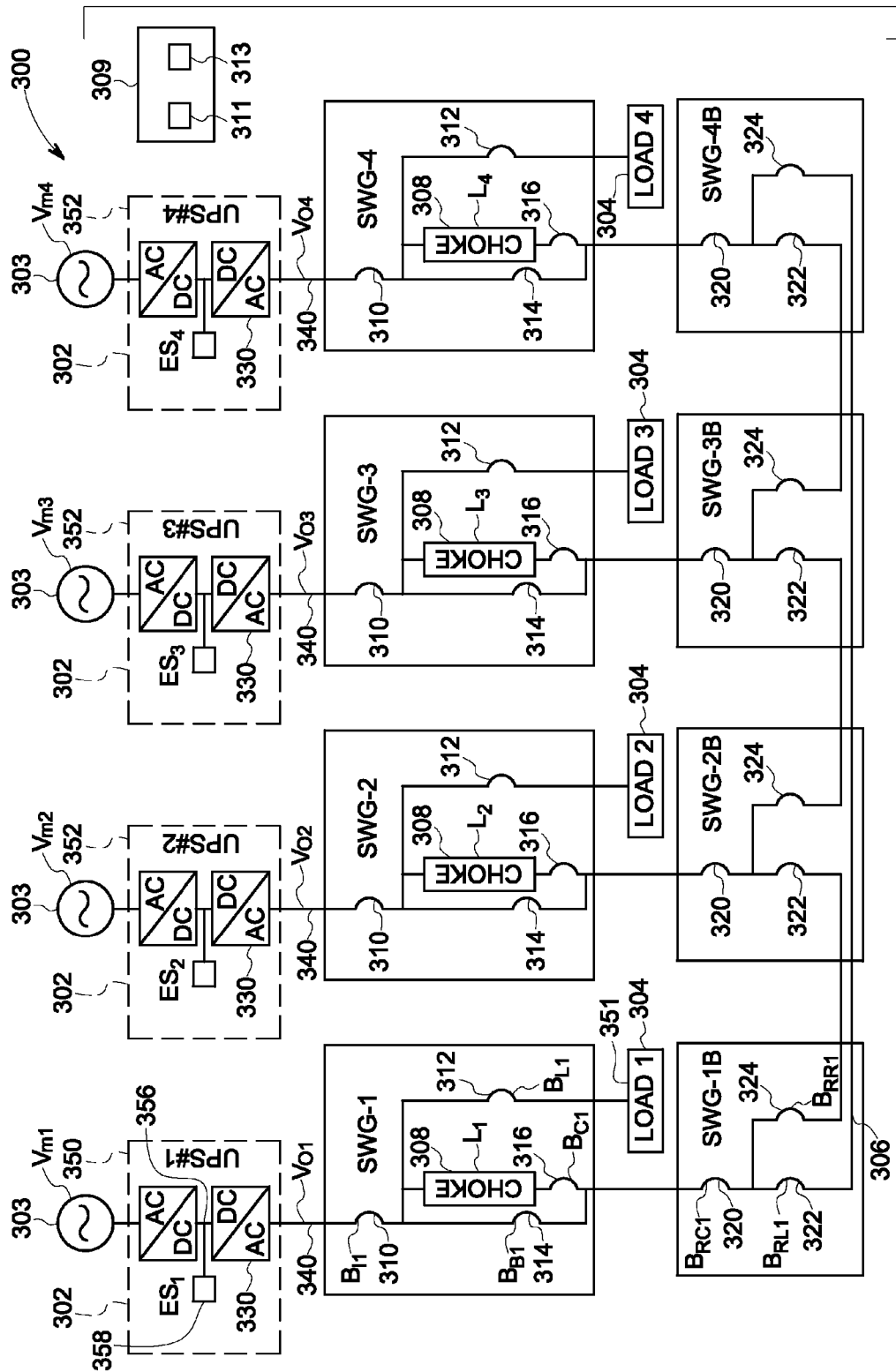
FIG. 1 is a schematic diagram of an exemplary ring bus architecture.

FIG. 1 is a schematic diagram of an exemplary redundant isolated-parallel (IP) uninterruptible power supply (UPS) ring bus architecture 300. In the exemplary embodiment, architecture 300 includes a plurality of UPSs 302 arranged in a ring architecture, or parallel architecture, as described herein. Specifically, architecture 300 includes four UPSs 302 in the exemplary embodiment. Alternatively, architecture 300 may include any number of UPSs 302 that enable architecture 300 to function as described herein. In the exemplary embodiment, architecture 300 is a three wire system. Alternatively, architecture 300 may be a four wire system (typically to supply loads that require a neutral wire).

In the exemplary embodiment, UPSs 302 are static double conversion UPSs (i.e., true on-line system systems). Both static and rotary UPSs may require droop control techniques for both voltage and frequency. In some cases, droop control for frequency alone may be sufficient. In some embodiments, droop control techniques are modified in order to handle non-linear loads.

Architecture 300 facilitates providing power to one or more loads 304. Under normal operation, one or more utilities function as a voltage source 303 and provide power alternating current (AC) power to loads 304. Generators may also function as voltage sources 303. Notably, voltage sources 303 do not need to be synchronized in architecture 300. This is advantageous, as every UPS 302 may be fed by an individual generator and/or utility, and there is no need to add additional equipment to synchronize voltage sources 303.

In the event of a failure of voltage source 303 or of the UPS rectifier, UPS 302 utilizes energy storage devices 358 (e.g., batteries, flywheels, etc. with their converter) connected to UPSs 302 to keep power flowing to loads 304, as described herein. Further, if a given UPS 302 fails, loads 304 are fed power through a ring bus 306, as described herein. In the exemplary embodiment, architecture 300 includes four loads 304. Alternatively, architecture 300 may include any suitable number of loads 304 that enable architecture 300 to function as described herein.

In the exemplary embodiment, each UPS 302 is electrically coupled to an associated load 304, and coupled to ring bus 306 through an associated choke 308 (e.g., an inductor). In architecture 300, without proper synchronization, UPSs 302 cannot work properly due to undesirable circulation currents. Accordingly, in the exemplary embodiment, at least one controller 309 controls operation of UPSs 302. More specifically, at least one controller 309 controls a frequency of an output voltage of each UPS 302, as described herein. The frequency for each UPS 302 is calculated as a function of power, as described herein.

In some embodiments, architecture 300 includes a separate, dedicated controller 309 for each UPS 302. Alternatively, system may include a single controller 309 that controls operation of all UPSs 302. Each controller 309 may include its own power system (not shown) such as a dedicated energy source (e.g., a battery). In some embodiments, each controller 309 is coupled to a substitute controller (not shown) that may be used in the event that controller 309 fails.

In the exemplary embodiment, each controller 309 is implemented by a processor 311 communicatively coupled to a memory device 313 for executing instructions. In some embodiments, executable instructions are stored in memory device 313. Alternatively, controller 309 may be implemented using any circuitry that enables controller 309 to control operation of UPSs 302 as described herein. For example, in some embodiments, controller 309 may include a state machine that learns or is pre-programmed to determine information relevant to which loads 304 require power.

In the exemplary embodiment, controller 309 performs one or more operations described herein by programming processor 311. For example, processor 311 may be programmed by encoding an operation as one or more executable instructions and by providing the executable instructions in memory device 313. Processor 311 may include one or more processing units (e.g., in a multi-core configuration). Further, processor 311 may be implemented using one or more heterogeneous processor systems in which a main processor is present with secondary processors on a single chip. As another illustrative example, processor 311 may be a symmetric multi-processor system containing multiple processors of the same type. Further, processor 311 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein. In the exemplary embodiment, processor 311 causes controller 309 to operate UPSs 302, as described herein.

In the exemplary embodiment, memory device 313 is one or more devices that enable information such as executable instructions and/or other data to be stored and retrieved. Memory device 313 may include one or more computer readable media, such as, without limitation, dynamic random access memory (DRAM), static random access memory (SRAM), a solid state disk, and/or a hard disk. Memory device 313 may be configured to store, without limitation, application source code, application object code, source code portions of interest, object code portions of interest, configuration data, execution events and/or any other type of data.

In the exemplary embodiment, as described in more detail below, one or more controllers 309, and more specifically processor 311, calculates an output voltage frequency for each UPS 302, and one or more controllers 309 operate each UPS 302 at the calculated frequency. Operating each UPS 302 at their respective calculated frequencies as determined by the droop controls makes it possible to achieve load sharing and stability in architecture 300. The frequencies of operation across the various UPSs 302 are different in transient conditions (e.g., following a variation of one or more loads 304). Once the droop controls are in steady state, all UPSs 302 operate at the same frequency but with a phase shift across chokes 308 that equalizes the active power provided by each UPS 302.

In architecture 300, each UPS 302 is able to supply power to an associated local load 304, as well as transfer active and reactive power to ring bus 306 through an associated choke 308. In the exemplary embodiment, architecture 300 facilitates sharing local loads 304 equally between UPSs 302 without any communication using droop controls, and in particular, frequency versus active power and voltage versus reactive power. This removes limitations on the number of UPSs 302 in architecture 300.

In the exemplary embodiment, architecture 300 includes a number of circuit breakers. Specifically, for each UPS 302, a first circuit breaker 310 is electrically coupled between UPS 302 and choke 308, a second circuit breaker 312 is electrically coupled between first circuit breaker 310 and local load 304, a third circuit breaker 314 is electrically coupled between first circuit breaker 310 and ring bus 306, and a fourth circuit breaker 316 is coupled between choke 308 and ring bus 306. Further, at ring bus 306, a central circuit breaker 320, a left circuit breaker 322, and a right circuit breaker 324 are associated with each UPS 302, and facilitate isolating UPS 302 from ring bus 306 and/or other UPSs 302 on ring bus 306. Each circuit breaker 310, 312, 314, 316, 320, 322, and 324 includes associated logic and relays (neither shown) for operation. The protection scheme provided by circuit breakers 310, 312, 314, 316, 320, 322, and 324 facilitates locating faults in architecture 300 and isolating those faults by opening the appropriate breakers. Further, third circuit breakers 314, also referred to as bypass breakers, facilitate bypassing choke 308 when the associated UPS 302 fails or is under maintenance. This facilitates improving the quality of the voltage on the associated local load 304 as the voltage drop on choke 308 is removed.

For ring bus applications, chokes 308 are sized to sustain a bolted fault on ring bus 306 for a long enough time to guarantee isolation of the fault through the activation of the specific breakers in architecture 300. Further, for situations where a breaker fails to open, additional time should be built-in to determine and execute an alternative fault isolation strategy. Accordingly, to facilitate maximizing a duration of time where the inverter in an associated UPS 302 can sustain a bolted fault on ring bus 306, chokes 308 may be sized to operate the inverter in a linear mode under a short circuit on ring bus 306.

Figure 2:
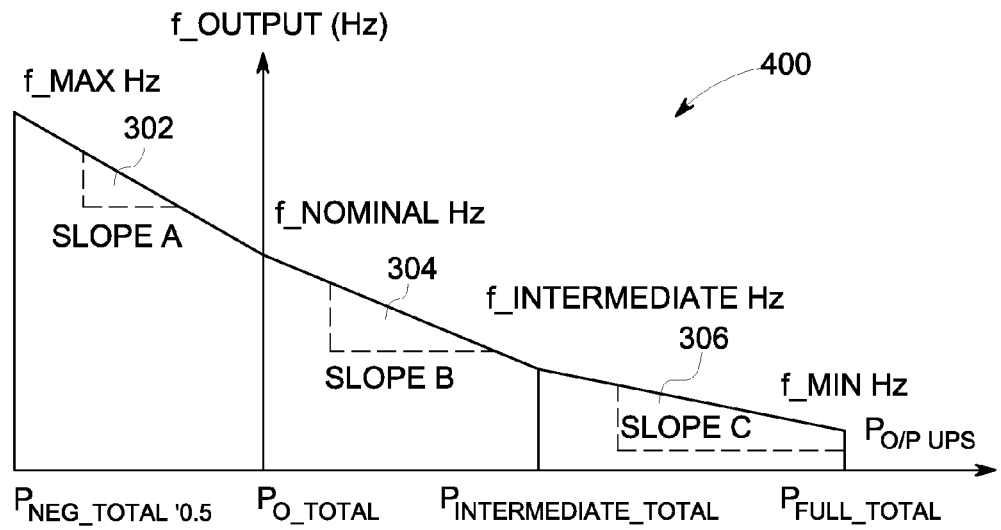
FIG. 2 is a diagram of an exemplary droop characteristic law that may be used to control the architecture shown in FIG. 1.

FIG. 2 is a diagram 400 of an exemplary droop characteristic law that may be used in some embodiments to calculate a frequency for UPSs 302 in architecture 200. As shown in FIG. 2, in the exemplary embodiment, the calculated frequency, $f_{\_output}$, for a given UPS 302 is a function of the output power, $P_{o/p}$, of the UPS 302. For example, when the output power of UPS 302 is zero (i.e., $P_{o/p}=P_{0\_Total}$), the frequency is a nominal frequency, $f_{\_nominal}$. $f_{\_nominal}$ may be, for example, 60 Hz. Although diagram 400 includes three operational zones, in some embodiments, the droop characteristic law includes only two zones: one zone for positive output powers and one zone for negative output powers. The sign of the output power may be detected, for example, at an output 340 of UPS 302.

However, wireless droop control load share has a relatively slow dynamic performance in adapting to load variations in a system, such as in architecture 300. This can be problematic, for example, where power backfeed is routed from ring bus 306 to output 340 of a UPS 302, resulting in a potential increase in the DC link voltage of UPS 302 that could result in failure of UPS 302 or stop operation. Further, static UPS inverters 330 may have a much smaller fault current capability as compared to a rotary UPS, resulting in requiring larger values of chokes 308. For ring bus applications, chokes 308 are sized to sustain a bolted fault on ring bus 306 for a long enough time to guarantee isolation of the fault through the activation of the specific breakers in architecture 300. Further, for situations where a breaker fails to open, additional time should be built-in to determine and execute an alternative fault isolation strategy.

Power backfeed from ring bus 306 to a particular UPS 302 typically occurs in the case of a large load imbalance and when a particular load 304 is suddenly removed. As an example, in FIG. 1, consider the case where a first UPS 350 has a local load 351 and remaining UPS 352 are not loaded. In this situation, ¾ of the power required by local load 351 is coming from remaining UPSs 352 through their respective chokes 308 and ring bus 306. At this point, if local load 351 is suddenly removed, there will be a large backfeed of power from ring bus 306 to the output 340 of first UPS 350.

This transient power flow from UPS output 340 to a DC link 356 can be directed to energy storage device 358 (for charging), to the utility (i.e., voltage source 303) if available, or reversed very quickly. The last solution may be more reliable, as it can operate in any situation (e.g., even when the utility is not available or energy storage device 358 is disconnected or is fully charged). One approach to addressing this issue is described above in reference to FIG. 2, in particular using an increased slope of the frequency versus active power droop in case of negative active powers. Alternatively, a different method may be utilized to manage the power backfeed from ring bus 306 to first UPS 350, as described below. This alternative method allows the expansion of the operating conditions of the system, in particular increased variations of local loads 304 of any UPS 302 can be afforded without requiring increasing a size of DC link capacitors.

The algorithmic solutions for a quick reversal of the power flow in the alternative method are based on a modification of the frequency droop control based on the instantaneous active power P, the average active power $P_{av}$, the derivatives of these powers, and voltage across DC link 356, $U_{DC}$. An exemplary algorithm is described below.

Figure 3:
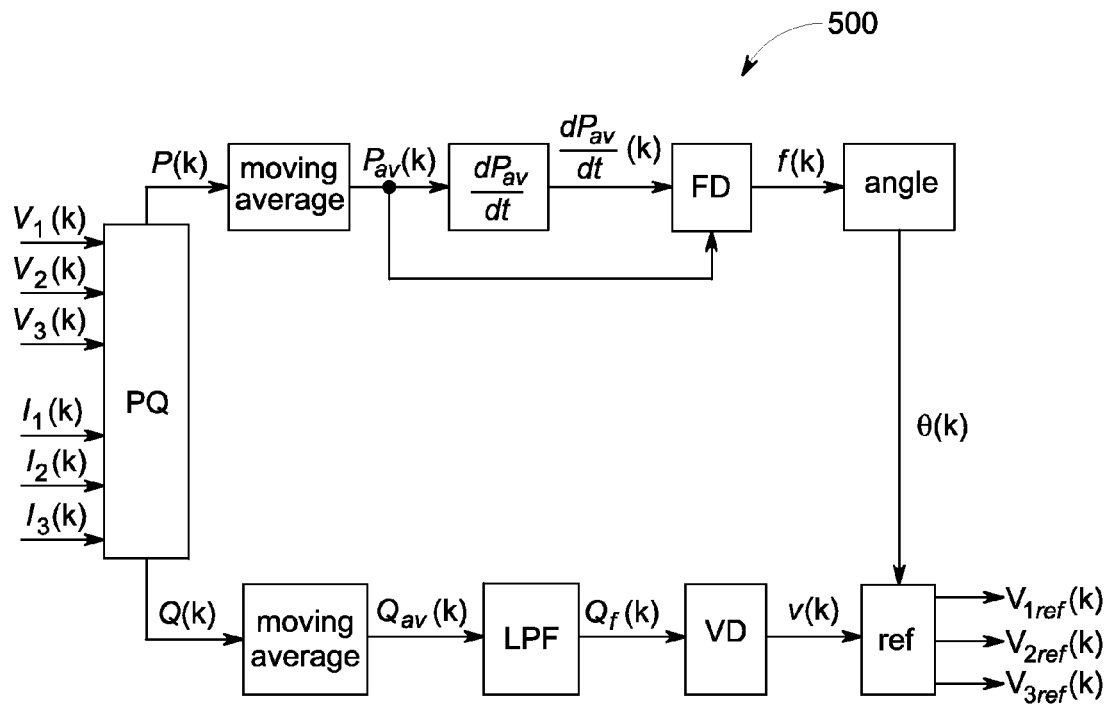
FIG. 3 is a block diagram of an exemplary droop control algorithm that may be used to control the system shown in FIG. 1.

Assume that UPSs 302 of FIG. 1 are in a three-wire configuration. $V_1$, $V_2$, and $V_3$ are the output phase to neutral voltages, and $I_1$, $I_2$, and $I_3$ are the output currents. Measurements of $V_1$, $V_2$, $V_3$, $I_1$, $I_2$, and $I_3$ are taken with a sampling time $T_E$. In the exemplary embodiment, the measurements are acquired using at least one controller, such as controller 309 (shown in FIG. 1). Further, the calculations and control algorithms described herein are also implemented using the controller. Notably, the techniques described herein may be applied to other configurations (e.g., three wire with a High Resistance Grounding (HRG) configurations or four wire configurations). FIG. 3 is a block diagram of an exemplary droop control algorithm 500.

In the exemplary embodiment, the instantaneous three phase active power, P, and reactive power Q, are determined by:

$$P(k)=V_1(k)I_1(k)+V_2(k)I_2(k)+V_3(k)I_3(k) \qquad \text{Equation 1}$$

$$Q(k)=(V_1(k)-V_2(k))I_3(k)+(V_2(k)-V_3(k))I_1(k)+(V_3(k)-V_1(k))I_2(k) \qquad \text{Equation 2}$$

A moving average over one period, T (e.g., 1s/50 for Conformance European (CE) standards or 1s/60 for Underwriters Laboratories Inc. (UL) standards), is applied to the active power samples:

$$P(k) \rightarrow [\text{moving average over } T] \rightarrow P_{av}(k) \qquad \text{Equation 3}$$

On the reactive power samples, a moving average over T is applied followed by a low pass filter at $T_f$, typically 0.5 seconds (s).

$$Q(k) \rightarrow [\text{moving average over } T] \rightarrow Q_{av}(k) \rightarrow [\text{low pass filter at } T_f] \rightarrow Q_f(k) \qquad \text{Equation 4}$$

The algorithmic solution for a quick reversal of the power flow is based on a modification of the frequency droop control described above in reference to FIG. 2. Equations 5-7 show an exemplary embodiment of an algorithm for calculating an output voltage frequency, f, for a given UPS 302.

$$f = f_n - K_{Pdroop}P_{av} - K_{Ddroop}\frac{dP_{av}}{dt} \qquad \text{Equation 5}$$

$$K_{Pdroop} = \begin{cases} KpP\left[\frac{\text{Hz}}{\text{kW}}\right]; & \text{for } P_{av} > 0 \\ KpN\left[\frac{\text{Hz}}{\text{kW}}\right]; & \text{for } P_{av} < 0 \end{cases} \qquad \text{Equation 6}$$

$$K_{Ddroop} = \begin{cases} KdP\left[\frac{1}{\text{W}}\right]; & \text{for } \frac{dP_{av}}{dt} > 0 \\ KdN\left[\frac{1}{\text{W}}\right]; & \text{for } \frac{dP_{av}}{dt} < 0 \end{cases} \qquad \text{Equation 7}$$

As shown in Equations 5-7, depending upon whether the average active power $P_{av}$ is positive or negative, a difference constant $K_{Pdroop}$ in units of Hz/kW is used. Similarly, depending on the sign of the derivative of the average active power, $dP_{av}/dt$, a different constant $K_{Ddroop}$ in units of 1/W is used. The constants KpP, KpN, KdP, and KdN are determined to facilitate optimizing dynamic performance of architecture 300 in response to step load variations of UPS active power in the case of power backfeed (i.e., negative active power) and in the case of power delivery (i.e., positive active power). In particular, it is important to facilitate guaranteeing stability of controls while at the same time limiting overvoltages in DC link 356 in the case of power backfeed.

Accordingly, In addition to the proportional droop with a different gain for negative powers (as discussed above in reference to FIG. 2), the algorithm of Equations 5-7 includes a derivative term (i.e., the $K_{Ddroop}$ $dP_{av}/dt$ term) with variable gains to handle increasing and decreasing power flows. The basic idea of this technique is to anticipate the detection of active power reversal. Other embodiments can be used, in addition or as alternatives, based on the instantaneous active power P, its derivative, the DC link voltage $U_{DC}$, and its derivative.

For the voltage droop, similar algorithms can be used to reverse the flow of reactive power if required. The voltage droop control will update the amplitude V(k) of the reference voltages as a function of the reactive power Q, the averaged reactive power $Q_{ac}$, the filtered averaged reactive power $Q_f$ and their derivatives.

The internal electrical angle θ is updated according to:

$$\theta(k+1)=\theta(k)+2\pi f(k)T_E \quad \text{Equation 8}$$

Further, the three reference voltages for the three phases are updated by:

$$V_{1ref}(k)=V(k)\sin(\theta(k)) \quad \text{Equation 9}$$

$$V_{2ref}(k)=V(k)\sin(\theta(k)-2\pi/3) \quad \text{Equation 10}$$

$$V_{3ref}(k)=V(k)\sin(\theta(k)+2\pi/3) \quad \text{Equation 11}$$

The respective UPS phase voltages will then follow these reference voltages according to the dynamics of the voltage droop algorithms. As shown in FIG. 3, in droop control algorithm 500, the droop controls determine reference voltages $V_{1ref}$, $V_{2ref}$, and $V_{3ref}$ for every phase of the UPS inverter based on the output phase to neutral voltages $V_1$, $V_2$, and $V_3$ and the output currents $I_1$, $I_2$, and $I_3$. The voltage control itself can be realized in many different ways.

Figure 4:
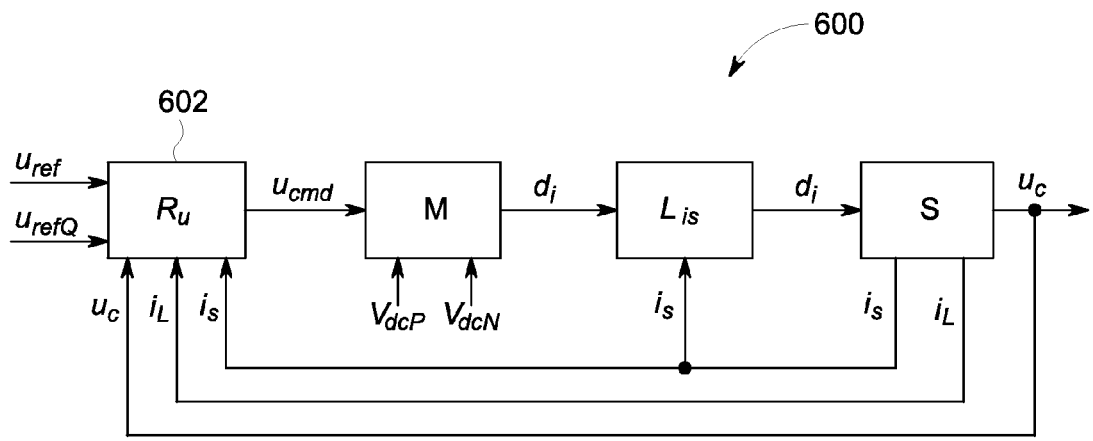
FIG. 4 is a block diagram of an exemplary voltage control algorithm that may be used to control the architecture shown in FIG. 1.

For example, FIG. 4 is a block diagram of an exemplary hybrid voltage/current control algorithm 600 that can be applied to each phase of the UPS inverter control. In particular, $u_{ref}$ is the reference voltage for each phase (i.e., $V_{1ref}$, $V_{2ref}$, and $V_{3ref}$ for the three phases shown in FIG. 3). A voltage controller block 602, implemented and determines a command voltage $u_{cmd}$ based on a reference voltage, $u_{ref}$, a quadrature reference voltage, $u_{refQ}$, a capacitor voltage, $u_c$, a load current, $i_L$, and a bridge current, $i_S$. The following Equation 12 is one possible implementation of voltage control algorithm 600.

$$u_{cmd}[k]=k_v u_{ref}[k]+k_{fv} u_{refQ}[k]-k_u u_c[k]-k_i i_s[k]+k_v i_L[k] \quad \text{Equation 12}$$

Alternatively, voltage control algorithm 600 may be implemented using any suitable algorithm. Further, in the exemplary embodiment, the UPS inverter is a two or three level inverter. Alternatively, the UPS inverter may have any suitable architecture.

As compared to at least some known power systems, the systems and methods described herein facilitate synchronizing a plurality of UPSs such that the plurality of UPSs do not interfere with or override one another. One or more control devices calculate an output voltage frequency for each UPS based at least on a derivative of an average active output power of the UPS. The control devices control the UPSs such that each UPS inverter operates at its respective calculated output voltage frequency to supply power to at least one load. Further, the systems and methods described herein facilitate maintaining stability of a power system when a load is suddenly removed from a UPS.

Notably, the systems and methods described herein are applicable independent of voltage level, and more particularly, are applicable to both low voltage (LV) (e.g., 480V phase-phase) and medium voltage (MV) (e.g., 13.8 kV phase-phase) applications.

Exemplary embodiments of systems and methods for uninterruptible power supplies are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

At least one technical effect of the systems and methods described herein includes (a) calculating an output voltage frequency for each UPS of a plurality of UPSs based at least on a derivative of an average active output power of the UPS; and (b) controlling operation of each UPS based on the respective calculated output voltage frequencies.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:
1. A system comprising:
a plurality of uninterruptible power supplies (UPSs);
a ring bus; and at least one controller communicatively coupled to said plurality of UPSs, said at least one controller configured to:
  calculate an output voltage frequency for each UPS of said plurality of UPSs, wherein the output voltage frequency for a UPS of said plurality of UPSs is calculated based at least on a derivative of an average active output power of said UPS; and
  control operation of said each UPS based on the respective calculated output voltage frequencies.

2. A system in accordance with claim 1, wherein said at least one controller is configured to calculate the output voltage frequency using $$f = f_n - K_{Pdroop}P_{av} - K_{Ddroop}\frac{dP_{av}}{dt},$$

wherein f is the output voltage frequency, $f_n$ is a predetermined frequency, $K_{Pdroop}$ is a first constant, $P_{av}$ is the average active output power, $K_{Ddroop}$ is a second constant, and $dP_{av}/dt$ is the derivative of the average active output power.

3. A system in accordance with claim 2, wherein a value of $K_{Pdroop}$ depends on a sign of $P_{av}$.

4. A system in accordance with claim 2, wherein a value of $K_{Ddroop}$ depends on a sign of $dP_{av}/dt$.

5. A system in accordance with claim 1, wherein said at least one controller is further configured to:
  calculate reference voltages for said each UPS, wherein the reference voltages are calculated based at least on a derivative of an average reactive output power of said UPS; and
  control operation of said each UPS based on the respective calculated reference voltages.

6. A system in accordance with claim 1, wherein said at least one controller comprises a plurality of controllers, each controller of said plurality of controllers associated with a different UPS of said plurality of UPSs.

7. A system in accordance with claim 1, wherein said at least one controller comprises a single controller.

8. At least one controller for controlling a power supply system that includes a plurality of uninterruptible power supplies (UPSs), a ring bus, and at least one load electrically coupled to the plurality of UPSs and the ring bus, said at least one controller comprising:
  a processor; and
  a memory device communicatively coupled to said processor, said memory device storing executable instructions configured to cause said processor to:
    calculate an output voltage frequency for each UPS of the plurality of UPSs, wherein the output voltage frequency for a UPS of the plurality of UPSs is calculated based at least on a derivative of an average active output power of the UPS; and
    control operation of each UPS based on the respective calculated output voltage frequencies.

9. At least one controller in accordance with claim 8, wherein to calculate an output voltage frequency for each UPS, said executable instructions are configured to cause said processor to calculate the output voltage frequency using $$f = f_n - K_{Pdroop}P_{av} - K_{Ddroop}\frac{dP_{av}}{dt},$$

wherein f is the output voltage frequency, $f_n$ is a predetermined frequency, $K_{Pdroop}$ is a first constant, $P_{av}$ is the average active output power, $K_{Ddroop}$ is a second constant, and $dP_{av}/dt$ is the derivative of the average active output power.

10. At least one controller in accordance with claim 9, wherein a value of $K_{Pdroop}$ depends on a sign of $P_{av}$.

11. At least one controller in accordance with claim 9, wherein a value of $K_{Ddroop}$ depends on a sign of $dP_{av}/dt$.

12. At least one controller in accordance with claim 8, wherein said executable instructions are further configured to cause said processor to:
  calculate reference voltages for each UPS of the plurality of UPSs, wherein the reference voltages are calculated based at least on a derivative of an average reactive output power of the UPS; and
  control operation of each UPS based on the respective calculated reference voltages.

13. At least one controller in accordance with claim 8, wherein said at least one controller comprises a plurality of controllers, each controller of said plurality of controllers associated with a different UPS of the plurality of UPSs.

14. At least one controller in accordance with claim 8, wherein said at least one controller comprises a single controller.

15. A method of controlling a power supply system that includes a plurality of uninterruptible power supplies (UPSs), a ring bus, and at least one load electrically coupled to the plurality of UPSs and the ring bus, the method comprising:
  calculating, using at least one controller communicatively coupled to the plurality of UPSs, an output voltage frequency for each UPS of the plurality of UPSs, wherein the output voltage frequency for a UPS of the plurality of UPSs is calculated based at least on a derivative of an average active output power of the UPS; and
  controlling operation of each UPS based on the respective calculated output voltage frequencies.

16. A method in accordance with claim 15, wherein calculating an output voltage frequency comprises calculating the output voltage frequency using $$f = f_n - K_{Pdroop}P_{av} - K_{Ddroop}\frac{dP_{av}}{dt},$$

wherein f is the output voltage frequency, $f_n$ is a predetermined frequency, $K_{Pdroop}$ is a first constant, $P_{av}$ is the average active output power, $K_{Ddroop}$ is a second constant, and $dP_{av}/dt$ is the derivative of the average active output power.

17. A method in accordance with claim 16, wherein a value of $K_{Pdroop}$ depends on a sign of $P_{av}$.

18. A method in accordance with claim 16, wherein a value of $K_{Ddroop}$ depends on a sign of $dP_{av}/dt$.

19. A method in accordance with claim 15, further comprising:
  calculating reference voltages for each UPS of the plurality of UPSs, wherein the reference voltages are calculated based at least on a derivative of an average reactive output power of the UPS; and
  controlling operation of each UPS based on the respective calculated reference voltages.

20. A method in accordance with claim 15, wherein calculating an output voltage frequency comprises calculating an output voltage frequency for each UPS using a separate controller associated with each UPS.

* * * * *